(12) United States Patent
Stanich et al.

(10) Patent No.: US 11,155,099 B2
(45) Date of Patent: Oct. 26, 2021

(54) PRINTER DENSITY CONTROL MECHANISM

(71) Applicants: Mikel Stanich, Longmont, CO (US); Nikita Gurudath, Boulder, CO (US)

(72) Inventors: Mikel Stanich, Longmont, CO (US); Nikita Gurudath, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 57 days.

(21) Appl. No.: 16/804,932

(22) Filed: Feb. 28, 2020

(65) Prior Publication Data

US 2021/0268805 A1 Sep. 2, 2021

(51) Int. Cl.
*B41J 2/205* (2006.01)
*B41J 29/393* (2006.01)
*G06T 7/00* (2017.01)

(52) U.S. Cl.
CPC .......... *B41J 2/2056* (2013.01); *B41J 29/393* (2013.01); *G06T 7/0004* (2013.01); *B41J 2029/3935* (2013.01); *G06T 2207/30144* (2013.01)

(58) Field of Classification Search
CPC ... B41J 2/2056; B41J 29/393; G06K 15/1881; H04N 1/4057; H04N 1/00068; H04N 1/33315; H04N 1/00005
USPC ...... 347/5, 9, 14, 15, 19; 358/1.2, 3.14, 3.16
See application file for complete search history.

(56) References Cited

U.S. PATENT DOCUMENTS

| | | | |
|---|---|---|---|
| 7,423,778 B2 | 9/2008 | Hersch et al. | |
| 8,100,057 B2 | 1/2012 | Hartmann et al. | |
| 8,576,450 B2 | 11/2013 | Shepherd et al. | |
| 8,734,034 B2 | 5/2014 | Morovic et al. | |
| 8,923,713 B2 | 12/2014 | Terao et al. | |
| 9,056,485 B2 | 6/2015 | Szafraniec | |
| 9,096,056 B2 | 8/2015 | Zhou et al. | |
| 9,102,157 B2 | 8/2015 | Prothon et al. | |
| 9,132,629 B2 | 9/2015 | Ward et al. | |
| 9,656,463 B1 | 5/2017 | Ernst et al. | |
| 9,661,154 B1 * | 5/2017 | Stanich | H04N 1/00068 |

(Continued)

FOREIGN PATENT DOCUMENTS

| | | |
|---|---|---|
| EP | 0454448 | 10/1991 |
| EP | 2313272 B1 | 2/2010 |

(Continued)

OTHER PUBLICATIONS

Rius, M., Casaldàliga, M., Vargas, X. F., Quintero, X., Segura, R., & del Vallès, S. C. (Jan. 2015). Printer Calibrations for HP Large Format Page Wide Technology. In NIP & Digital Fabrication Conference (vol. 2015, No. 1, pp. 326-331). Society for Imaging Science and Technology.

(Continued)

*Primary Examiner* — An H Do
(74) *Attorney, Agent, or Firm* — Jaffery Watson Mendonsa & Hamilton LLP

(57) ABSTRACT

A system is disclosed. The system at least one physical memory device to store density control logic and one or more processors coupled with the at least one physical memory device, to execute the density control logic to generate first uncalibrated ink deposition data, receive first calibrated ink deposition data, generate a first transfer function based on the first uncalibrated ink deposition data and the first calibrated ink deposition data and transmit the first transfer function.

20 Claims, 8 Drawing Sheets

(56) References Cited

U.S. PATENT DOCUMENTS

| | | |
|---|---|---|
| 9,785,873 B2 | 10/2017 | Stanich et al. |
| 10,129,436 B2 | 11/2018 | Kimura |
| 10,214,038 B2 | 2/2019 | Klinger et al. |
| 10,237,452 B2 | 3/2019 | Rius Rossell et al. |
| 10,338,496 B2 | 7/2019 | Able et al. |
| 2003/0179410 A1 | 9/2003 | Velde |
| 2013/0101328 A1 | 4/2013 | Morovic et al. |
| 2017/0259560 A1 | 9/2017 | Sreenivasan et al. |
| 2018/0234582 A1 | 8/2018 | Stanich et al. |
| 2019/0268482 A1 | 8/2019 | Stanich et al. |
| 2019/0270304 A1 | 9/2019 | Stanich et al. |

FOREIGN PATENT DOCUMENTS

| | | |
|---|---|---|
| JP | 2018174143 | 11/2018 |
| WO | 2018022077 A1 | 2/2018 |

OTHER PUBLICATIONS

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi:10.3390/ma9110910. See highlighted and underlined sections.

\* cited by examiner

```
┌─────────────────────────────────────────────────────┐
│           INK DEPOSITION COMPUTE LOGIC              │
│                      310                            │
│                                                     │
│                                                     │
│   ┌─────────────────────────────────────────────┐   │
│   │ UNCALIBRATED INK DEPOSITION GENERATION LOGIC│   │
│   │                   420                       │   │
│   │                                             │   │
│   └─────────────────────────────────────────────┘   │
│                                                     │
│                                                     │
└─────────────────────────────────────────────────────┘
```

Figure 4A

PRINTER DENSITY CONTROL MECHANISM

FIELD OF THE INVENTION

The invention relates to the field of printing systems, and in particular, to controlling density of a printing system.

BACKGROUND

In commercial and transactional printers, optical density (OD) consistency represents a critical attribute (or characteristic) of print quality. Conventional methods of measuring OD changes in a printing system involve adding specific test images to a print job to facilitate the OD measurements, dynamically performing optical measurements of the test images using test equipment to deduce OD changes, or removing specific test images and measuring offline using a spectrophotometer to process the OD values in order to track changes over time.

However, the above-described methods require additional printed pages, which results in wasted paper and ink. Further, test pages must be removed from the job and discarded, or measured offline. Such offline measurements require additional human resources, as well as the cost of measuring devices. Alternately small patches may be printed near the edge of printed sheets that are measured using a scanner or dynamic spectrophotometer. Although there is no added paper in this case, the measurements may not accurately reflect OD for over an entire printed medium.

Accordingly, an improved mechanism to perform density control in a printer is desired.

SUMMARY

In one embodiment, a method is disclosed. The method includes generating first uncalibrated ink deposition data, receiving first calibrated ink deposition data, generating a first transfer function based on the first uncalibrated ink deposition data and the first calibrated ink deposition data and transmitting the first transfer function

BRIEF DESCRIPTION OF THE DRAWINGS

A better understanding of the present invention can be obtained from the following detailed description in conjunction with the following drawings, in which:

FIG. 4A illustrates one embodiment of ink deposition curve compute logic;

DETAILED DESCRIPTION

A mechanism to perform printer density control is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
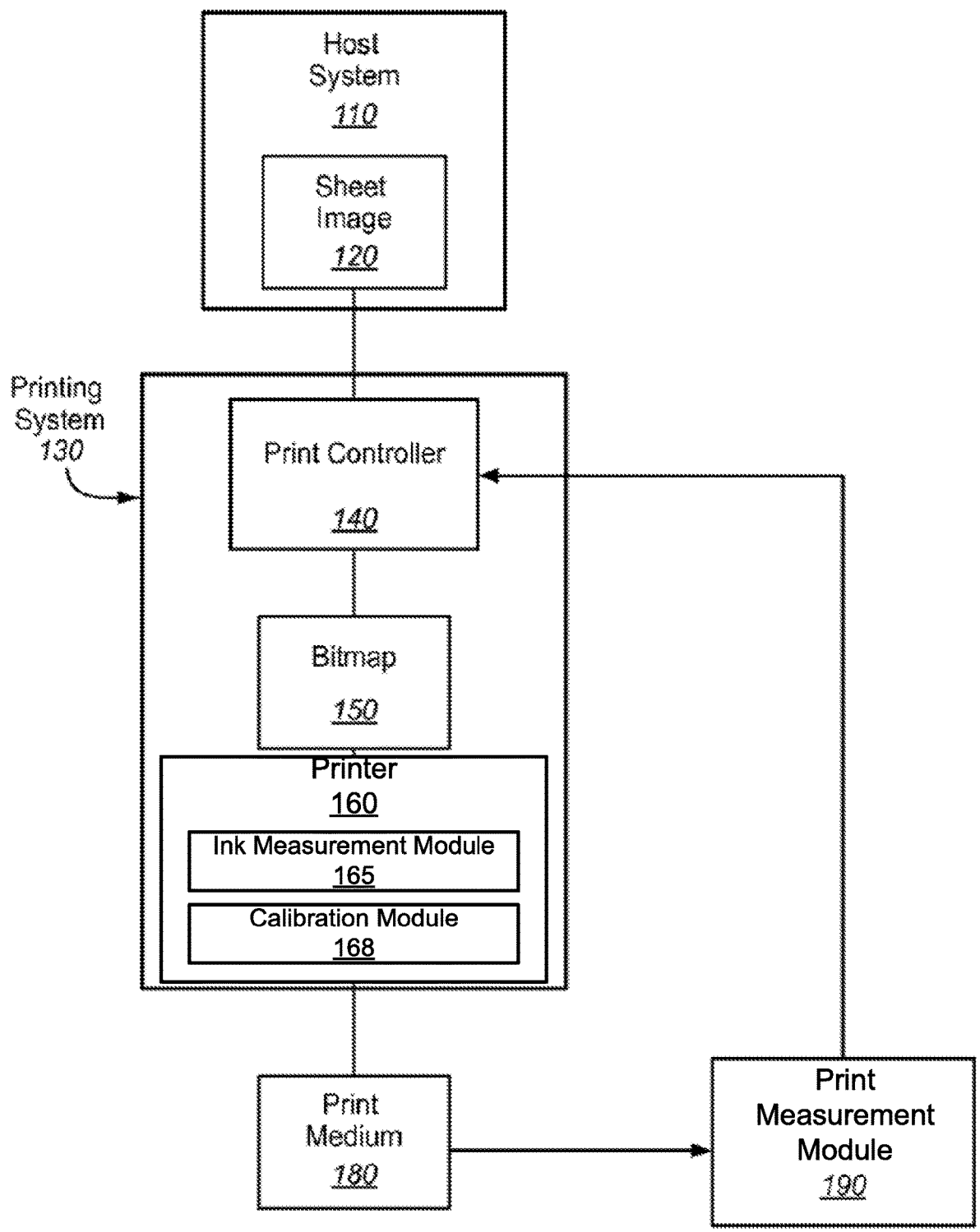
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, textile, plastic and/or any medium suitable for printing) via a printer 160. The resulting print medium 180 may be printed in color and/or in any of number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. Print controller 140 and printer 160 may both be implemented in the same device or in separate devices with coupling.

Print measurement module 190 may be any system, device, software, circuitry and/or other suitable component operable to measure and process the spectral information of ink printed on medium 180 on a per color basis (e.g., print measurement data). In one embodiment, print measurement module 190 is implemented as a spectrophotometer to obtain print measurement data such as optical densities (OD) of the images of the test print job printed on medium 180. Print measurement module 190 communicates the print measurement data with print controller 140 to be used in processes such as determining an ink deposition curve.

An additional application of print measurement module 190 is to measure the printed output of the printer for the purpose of establishing a calibration, which when applied to the processing of the print data achieves a specific desired (e.g., target) calibrated OD. The print measurement module 190 may be a stand-alone process or be integrated into the printing system 130.

According to one embodiment, printer 160 includes an ink measurement module 165. Ink measurement module 165 may be any system, device, software, circuitry and/or other suitable component operable to measure and process ink usage by printer 160 on a per color basis (e.g., ink measurement data). In one embodiment, ink measurement data includes the total quantity (volume or mass) of ink for each primary color used to print a specific job or number of pages. The amount of ink in ink deposition may be represented by standardized measurement units of mass or volume (e.g., milligrams or milliliters).

Ink measurement module 165 communicates the ink measurement data with print controller 140 to be used in processes such as determining ink deposition data. As will be discussed in more detail below, ink deposition is defined as the amount of ink deposited per printed device pel, where a pel is a picture element of the printer 160 (e.g., the printing device). In one embodiment, the amount of ink deposition changes as a function of digital count, where digital count is the gray level representing the pels in the bitmap 150. In such an embodiment, the pels in bitmap 150 ranges from 0-255 for a typical 8 bit system. Additionally, the digital count is a control parameter of the output pel.

In one embodiment, an ink deposition curve is the ink deposition defined over the range of all possible gray levels (e.g., 0-255). In such an embodiment, ink deposition is computed on an average basis to eliminate local variations, due to halftoning using a set of discrete ink drop sizes. Ink drop sizes can be determined by analyzing the volume of ink used, from ink measurement module 165, combined with the number of ink drops of each size used during printing over the same print interval (e.g., period of time, number of pages, etc.).

The ink measurement module 165 may include any combination of pumps, flow meters, weighing devices, ink drop counters, ink drop size data and associated processing suitable to generate ink measurement data. Additionally, ink measurement module 165 may be a stand-alone process or be integrated into the printer 160.

Figure 2A:
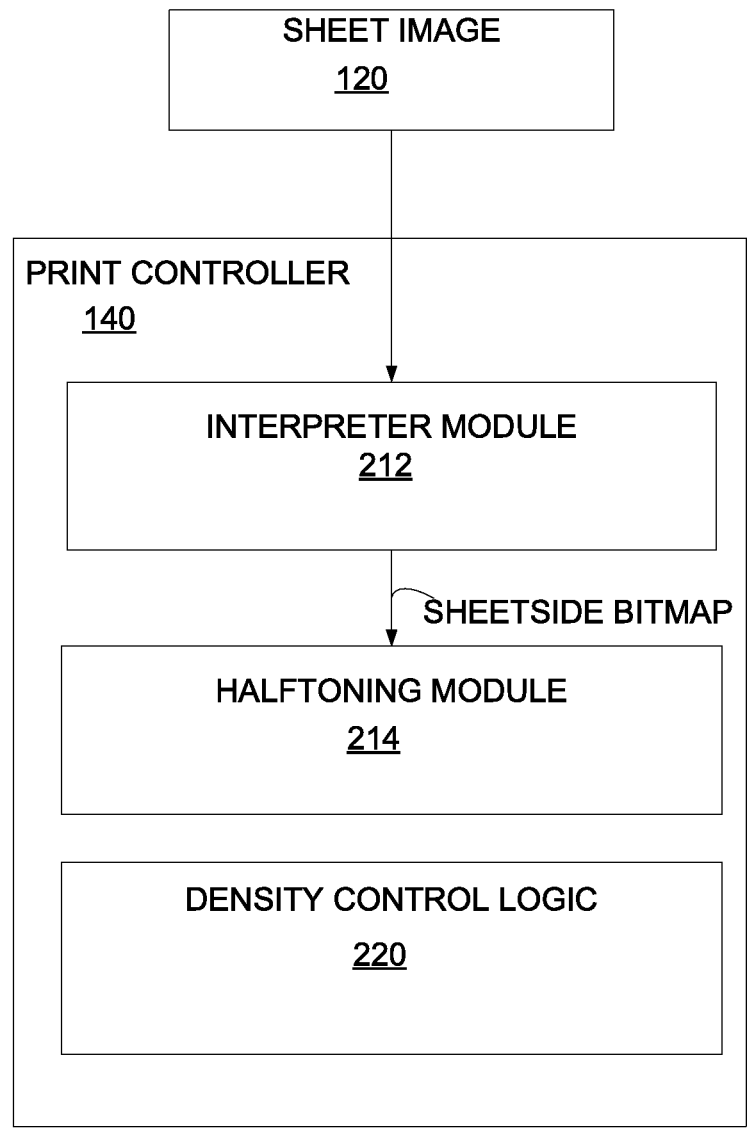
FIGS. 2A&2B are block diagrams illustrating embodiment of a print controller.
Figure 2B:
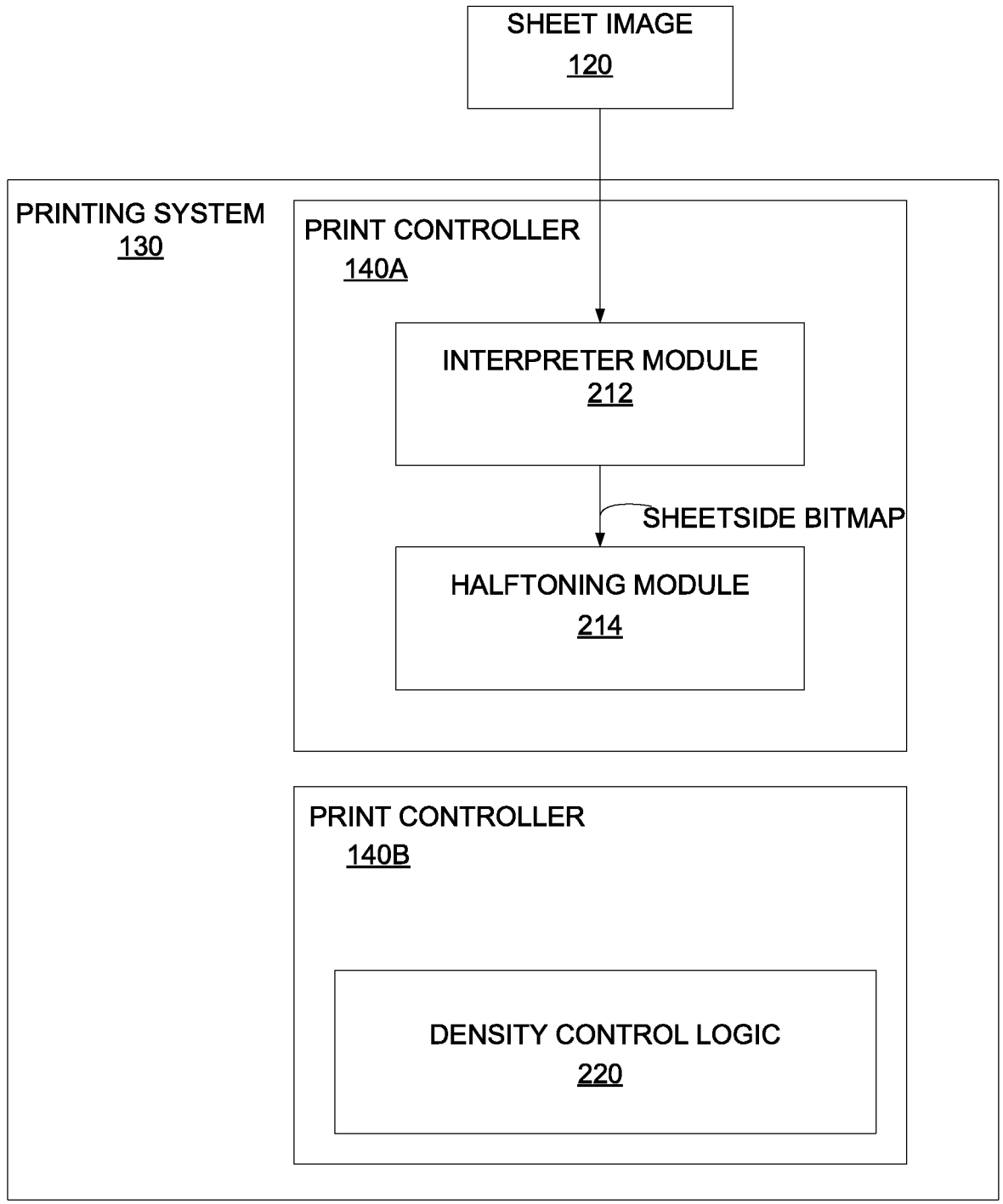

FIGS. 2A&2B illustrate embodiments implementing print controllers 140. FIG. 2A illustrates a print controller 140 (e.g., DFE or digital front end), in its generalized form, including interpreter module 212, halftoning module 214 and density control logic 220, while FIG. 2B illustrates an embodiment having print controllers 140A&140B. In this embodiment, print controller 140A includes interpreter module 212 and halftoning module 214, and print controller 140B includes density control logic 220. Print controllers 140A and 140B may be implemented in the same printing system 130 (as shown) or may be implemented separately.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. Interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pels to halftone patterns of CMYK ink for application to the paper. A halftone design may comprise a pre-defined mapping of input pixel gray levels to output drop sizes based on pixel location. In one embodiment, the halftone design may include a finite set of transition thresholds between a finite collection of successively larger drop sizes, beginning with zero and ending with a maximum drop size (e.g., threshold arrays or multibit threshold arrays). In another embodiment, the halftone design may include a three dimensional look-up table with all included gray level values. The table provides the halftone patterns for each different gray level. In a further embodiment, halftoning module 214 performs the multi-bit halftoning using the halftone design (e.g. multi-bit threshold arrays (MTAs)). Multi-bit halftoning extends the binary threshold array concept to more than one non-zero drop size. A requirement of all mask-based systems is that halftone drop sizes can be determined for all points of the sheetside bitmap. Since masks are smaller than the bitmap size, the mask or LUT is tiled across the bitmap to obtain halftoning drop sizes for each pel.

Density control logic 220 is implemented to monitor printing system 130 based on printer characteristic data. According to one embodiment, density control logic 220 operates as a control system to maintain a target OD. In such an embodiment, density control logic 220 performs non-optical processes to estimate an OD based on measured ink drop sizes, where "non-optical" refers to performing the process without optical sensing of OD in printer 160. The predicted OD is subsequently used to generate an updated transfer function. The updated transfer function is subsequently implemented to calibrate printer 160 to provide consistent printing.

In one embodiment, ink drop sizes (e.g., amounts of ink per ink drop size) are received from ink measurement module 165 during the operation of printer 160. The amount of ink in ink deposition may be represented by standardized measurement units of mass or volume (e.g., milligrams or milliliters). The ink drop sizes, in turn, are used to generate calibrated and uncalibrated ink deposition data. The calibrated and uncalibrated ink deposition data are then used to generate an updated transfer function.

Figure 3:
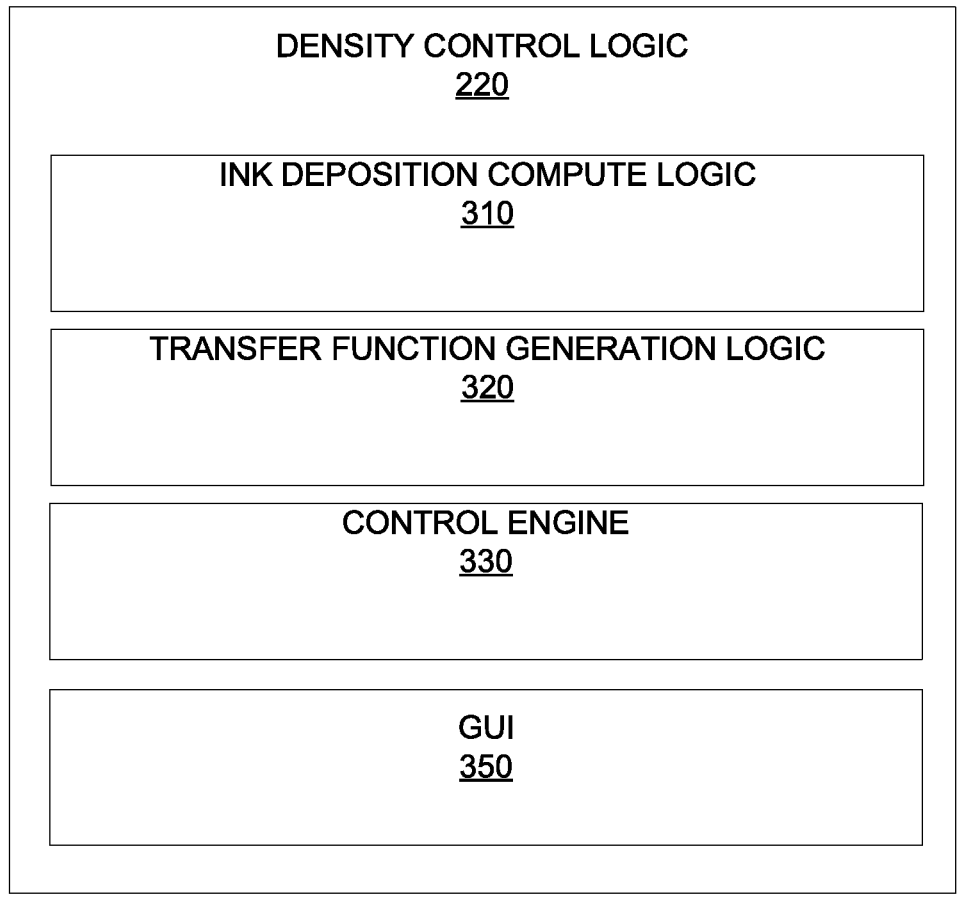
FIG. 3 illustrates one embodiment of density control logic.

FIG. 3 illustrates one embodiment of density control logic 220, which includes ink deposition compute logic 310, transfer function generation logic 320, control engine 330 and a graphical user interface (GUI) 350. Ink deposition compute logic 310 is implemented to compute uncalibrated ink deposition data. FIG. 4A illustrates one embodiment of ink deposition compute logic 310. As shown in FIG. 4A, ink deposition compute logic 310 includes uncalibrated ink deposition generation logic 420.

According to one embodiment, uncalibrated ink deposition generation logic 420 computes uncalibrated ink deposition data for each color, where ink deposition data may be represented as one or more data ink deposition curves and/or tables. In such an embodiment, uncalibrated ink deposition generation logic 420 dynamically computes the uncalibrated ink deposition data based on MTAs in a halftone design and updated (e.g., changed) drop sizes. In a further embodiment, ink deposition generation logic 420 recomputes the uncalibrated ink deposition data at pre-configured time intervals. In this embodiment, the time intervals are configured via GUI 350.

Referring back to FIG. 3, transfer function generation logic 320 dynamically generates updated transfer functions. According to one embodiment, transfer function generation logic 320 generates a transfer function based on the computed uncalibrated ink deposition data and received calibrated ink deposition data. The calibrated ink deposition represents an amount of ink deposition the printer employs when printing to achieve a calibrated target OD response, while the uncalibrated ink deposition is the amount of ink deposition the printer employs when printing takes place without OD compensation. Effectively the uncalibrated ink deposition is the maximum amount of ink deposition available. This corresponds to the halftoning process using an identity transfer function. The desired calibrated ink deposition versus digital count is constant, since the objective is to achieve consistent OD across the entire tone curve while printing.

Figure 4B:
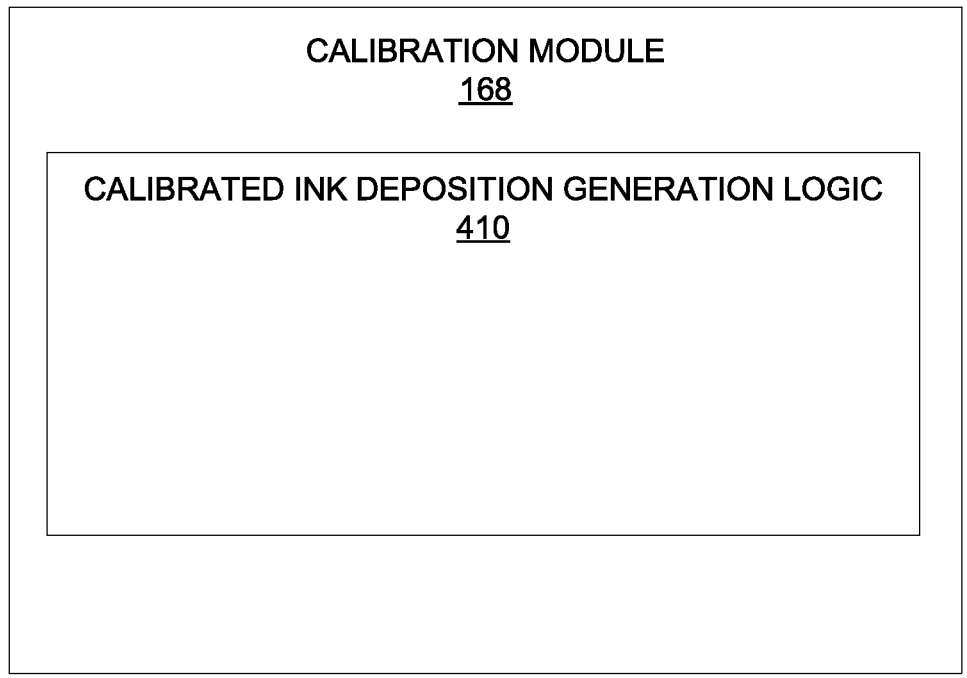
FIG. 4B illustrates one embodiment of a calibration module.

In one embodiment, the calibrated ink deposition data is received from a calibration module 168 at printer 160 (e.g., target ink deposition). FIG. 4B illustrates one embodiment of calibration module 168 including calibrated ink deposition generation logic 410 to generate the calibrated ink deposition data. According to one embodiment, calibrated ink deposition generation logic 410 may generate the calibrated ink deposition data via a printer ink model. In this embodiment, the printer ink model comprises a Weibull ink model in which the calibrated ink deposition data is generated by applying Weibull regression data to a measured OD data to establish an OD versus ink deposition relationship.

Weibull cumulative distribution function (CDF) describes the probability that a real-valued random variable X with a given probability will be found at a value less than or equal to x (where x is a one possible value of the random variable X). Intuitively, it is the "area under the curve" function of the probability density function (PDF). Cumulative distribution functions are also used to specify the distribution of multivariate random variables. The Weibull CDF model that is employed uses two parameters.

In one embodiment, the Weibull CDF is modified to incorporate paper white and the solid area maximum optical density. This modified Weibull CDF will be described as simply "Weibull CDF". The forward Weibull CDF relates ink deposition to OD, while the inverse Weibull CDF relates OD to ink deposition. In one embodiment, ink deposition (or ink coverage) is represented by:

$$\text{Ink Coverage} = \frac{\text{Total Ink Mass}}{\text{Area}},$$

$$\text{Total Ink Mass} = \sum_{Area} \text{Drop sizes milligrams}$$

In one embodiment, a four parameter Weibull model is implemented using $OD=(p(3) *(1 -\exp^{((-(x\ /\ p(1))\wedge p(2))))}+p(4)$. In such an embodiment, the two-parameter classical Weibull CDF function has been extended to four parameters to create a paper-ink model. The two additional parameters allow the model to account for paper white and absolute paper referenced OD, where x=ink deposition mass per area, p(1)=ink mass per area scale factor, which is similar to the classical Weibull scale factor in the way it influences the shape of the function, p(2)=slope factor.

This factor influences the shape of the function similarly to the classical Weibull slope factor, p(3)=maximum paper referenced OD and p(4)=paper white OD. Slope factors p(1) and p(2) are the parameters used in the classical two parameter Weibull CDF function. The p(1) scale factor adjusts the shape of the curve so as to modify how much ink deposition is required to achieve various ODs. Higher values for p(1) require more ink deposition to achieve higher OD.

In addition, since p(1) is similar to two-parameter classical Weibull slope, it indicates the point of the curve where the ink deposition is approximately 63% of the paper referenced maximum OD, parameter p(3). The model provides a value for the maximum absolute OD for the ink/paper. This maximum OD will be given by the sum of the p(3) and p(4) parameters. Based on the Weibull CDF parameters, the calibrated ink deposition data may be generated.

In an alternative embodiment, calibrated ink deposition generation logic 410 may generate the calibrated ink deposition data using the uncalibrated ink deposition data and an initial print engine calibrated transfer function. In such an embodiment, the calibrated ink deposition data is generated using a direct deposit process. The direct deposit process provides a direct conversion of uncalibrated ink deposition data to calibrated ink deposition data using the print engine calibrated transfer function (or transfer function) by mapping an input digital count to an output digital count. The transfer function comprises a mapping of an input digital count to an output digital count for the system. Transfer functions may be received or generated (e.g., generated based on target OD versus input digital count data and measured OD versus output digital count data). The uncalibrated ink deposition data represents a mapping of the input digital count to an amount of ink deposition. Thus, the direct deposit process uses a print engine calibration transfer function to transform preliminary uncalibrated ink deposition data into calibrated ink deposition data (e.g., ink deposition tables). According to one embodiment, no information regarding the target OD response is required in the direct deposit process.

In this embodiment, the calibrated ink deposition determined from the initial uncalibrated ink deposition and transfer function, forms the target ink deposition which must be maintained to obtain consistent printing as defined by the initial uncalibrated ink deposition and transfer function. An example of such a case would be calibrations involving near neutral targets of linear CIELab a* and b* values combined with specific OD response for a combination of CMY.

In yet a further embodiment, the uncalibrated print engine response (e.g., OD expressed as a function of digital count) may be converted into a calibrated print engine response by transforming the uncalibrated print engine response with the transfer function (TF). For example, given OD(DC) as representing an uncalibrated optical density (OD) of the printer vs digital count, DC'=TF(DC) defines a transformation of digital count levels using a print engine calibration transfer function (TF) to produce modified levels (DC'), where TF is computed to transform the OD into a calibrated printer response OD'.

Based on the above, OD'(DC)=OD(TF(DC)), where OD' is the calibrated target response of the printer. In a further embodiment, a printer functional relationship (e.g., XX(DC), where DC is the uncalibrated printer values) may be transformed into a calibrated printer relationship (XX') by using the transfer function. Thus, ID'(DC)=ID(TF(DC)) provides an updated (or current) calibrated ink deposition data (ID') derived from the uncalibrated ink deposition ID and the printer transfer function. The ink deposition ID' (DC), forms the target for the printer system to maintain consistent quality.

As shown above, implementation of the direct deposit process dispenses with an implementation of the Weibull regression requirement of having a specific OD target, which is important in printing systems that do not have OD targets.

Once the uncalibrated ink deposition data and calibrated ink deposition data are available, transfer function generation logic 320 generates a transfer function. The initial transfer function may be generated by third party calibration software. Examples include G7 calibration software which finds transfer functions, which achieve near neutral targets such as linear CIELab a* and b* values. Alternatively, third party calibration software which achieves dot gain objectives may be employed. The only requirement is that they generate an initial set of transfer functions. The initial set of transfer functions is used with the direct deposit method to transform uncalibrated ink deposition to generate a target calibrated ink deposition. The objective is to maintain the target calibrated ink deposition as the printer operates to maintain the original calibrated objective. New drop sizes determined from ink volumes and drop counts as the printer operates are then used to generate a new uncalibrated ink deposition. To maintain the target ink deposition a transfer function must be determined using the uncalibrated and target calibrated ink depositions. The required transfer function is given by the equation $TF\_new(DC)=UID^{-1}(CID(DC))$, where UID is the inverse of the uncalibrated ink deposition function and CID is the calibrated ink deposition target. This new Transfer Function is then employed for subsequent printing to maintain the target ink deposition levels. In doing so, the target objectives established by the initial calibration are reestablished by providing the print process with the same calibrated ink deposition determined from the initial calibration.

Referring back to FIG. 3, control engine 330 is implemented to receive an updated transfer function (TF_new), upon generation at transfer function generation logic 320 and transmit the updated transfer function to printer 160. Printer 160 subsequently begins printing operations with the updated transfer function in place of a previous (or the initial) transfer function. In a further embodiment, control engine 330 may transmit statistics regarding the updated transfer function and/or measurements implemented to generate the transfer function (e.g., ink drop values, halftones, calibrated/uncalibrated ink deposition values, Weibull parameters, etc.) for display at GUI 350.

Figure 5:
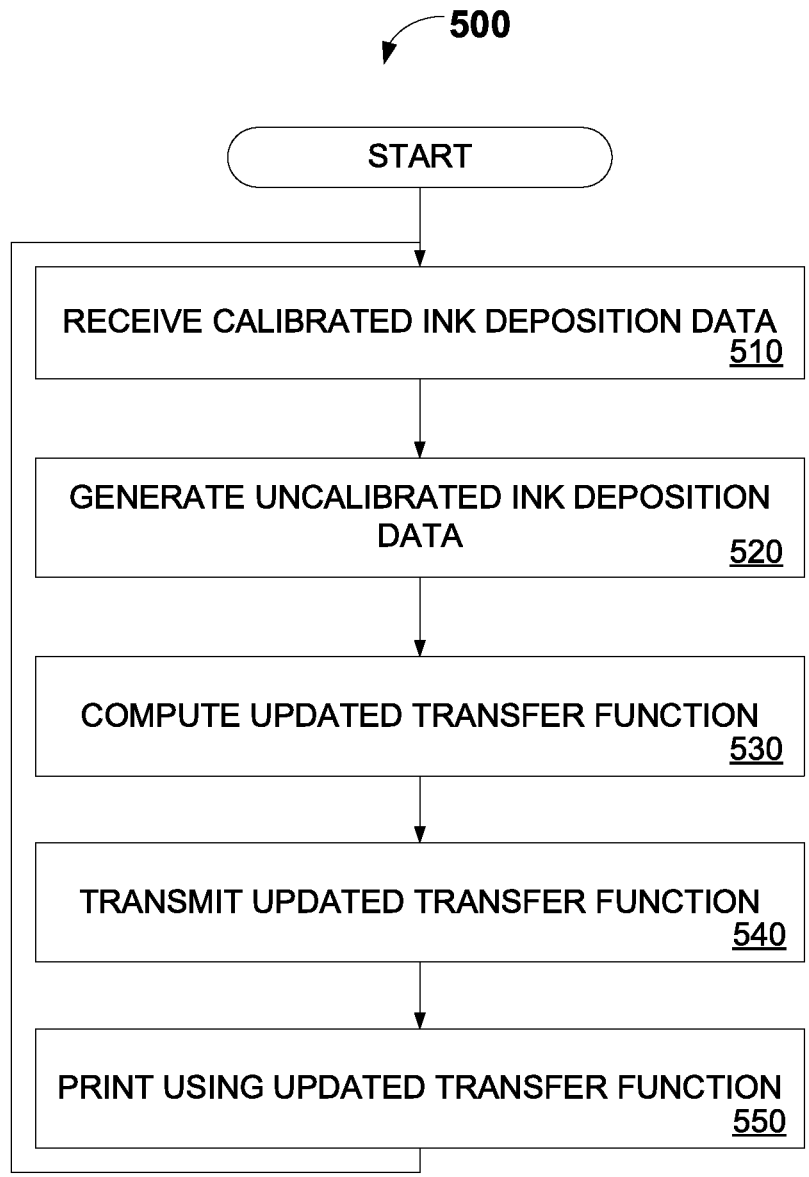
FIG. 5 is a flow diagram illustrating one embodiment of a process for performing printer density control.

FIG. 5 is a flow diagram illustrating one embodiment of a process 500 for performing printer density control. Process 500 may be performed by processing logic that may comprise hardware (e.g., circuitry, dedicated logic, programmable logic, etc.), software (such as instructions run on a processing device), or a combination thereof. In one embodiment, process 500 may be performed by density control logic 220. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where calibrated ink deposition data is received. As discussed above, the calibrated ink deposition data may be generated using an ink model (e.g., Weibull), or via a direct deposit process. At processing block 520, uncalibrated ink deposition data is generated (e.g., via a halftone design and updated drop sizes). At processing block 530, a an updated transfer function is generated based on the calibrated ink deposition data and the uncalibrated ink deposition data. At processing block 540, the updated transfer function is transmitted to the printer. At processing block 550, the printer continues (or begins) printing operations using the updated transfer function.

Figure 6:
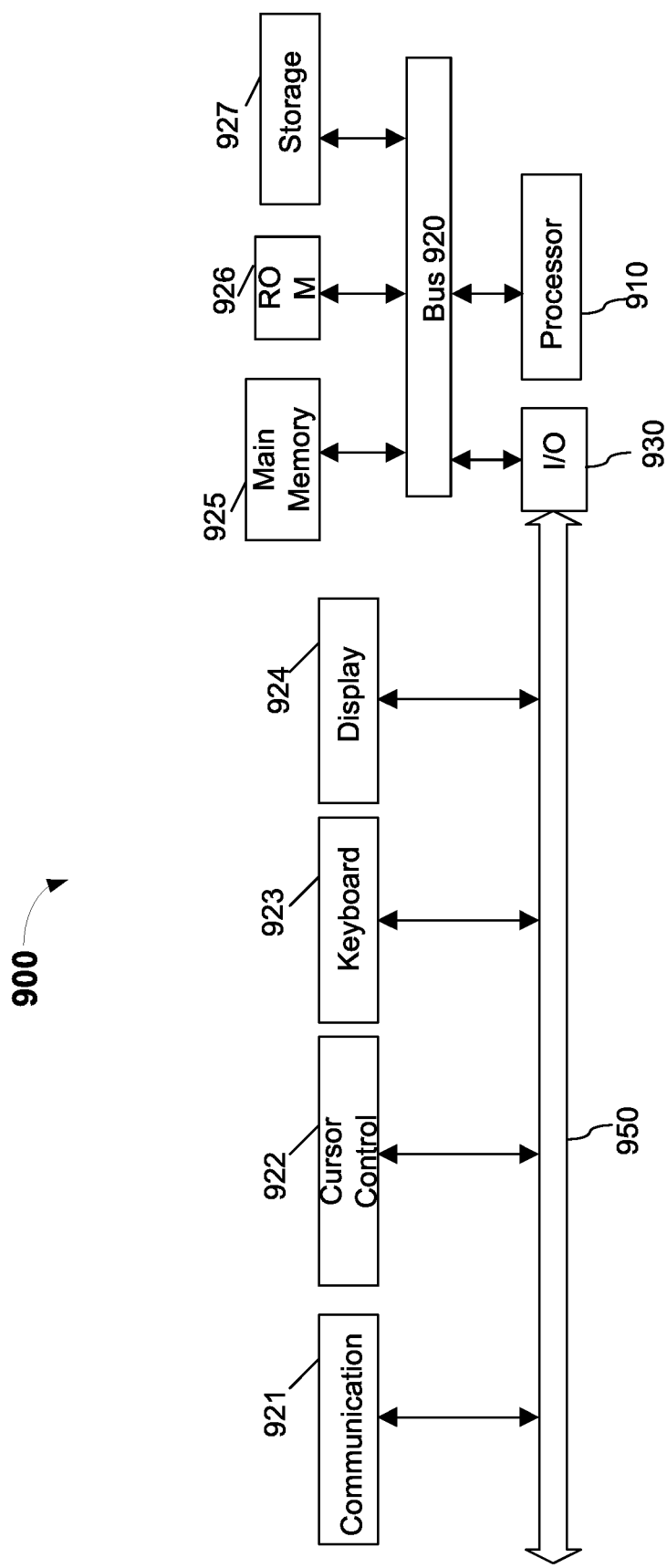
FIG. 6 illustrates one embodiment of a computer system.

FIG. 6 illustrates a computer system 900 on which printing host 110, printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard 923 (e.g., alphanumeric input device) and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store ink estimation logic; and
   one or more processors coupled with the at least one physical memory device, to execute control logic to:
   generate first uncalibrated ink deposition data based on ink drop size data and a first halftone design;
   receive first calibrated ink deposition data;
   generate a first transfer function based on the first uncalibrated ink deposition data and the first calibrated ink deposition data; and
   transmit the first transfer function.

2. The system of claim 1, wherein generating the first uncalibrated ink deposition data further comprises receiving the ink drop size data for each of a plurality of color planes and receiving the first halftone design.

3. The system of claim 1, wherein the first calibrated ink deposition data is generated by applying an ink model to a target optical density (OD) printer response curve to generate the first calibrated ink deposition data.

4. The system of claim 3, wherein the ink model comprises a Weibull ink model.

5. The system of claim 1, wherein the first calibrated ink deposition data is generated by performing a direct conversion of the uncalibrated ink deposition data to the calibrated ink deposition data by applying the transfer function to the uncalibrated ink deposition data.

6. The system of claim 1, wherein the control logic further to generate second uncalibrated ink deposition data, generate a second transfer function based on the second uncalibrated ink deposition data and the first calibrated ink deposition data and transmit the second transfer function.

7. The system of claim 1, further comprising a print engine to receive the first transfer function and perform printing operations using the first transfer function.

8. At least one computer readable medium having instructions stored thereon, which when executed by one or more processors, cause the processors to:
   generate first uncalibrated ink deposition data based on the ink drop size data and the first halftone design;
   receive first calibrated ink deposition data;
   generate a first transfer function based on the first uncalibrated ink deposition data and the first calibrated ink deposition data; and
   transmit the first transfer function.

9. The computer readable medium of claim 8, wherein generating the first uncalibrated ink deposition data further comprises receiving the ink drop size data for each of a plurality of color planes and receiving the first halftone design.

10. The computer readable medium of claim 8, wherein the first calibrated ink deposition data is generated by applying an ink model to a target optical density (OD) printer response curve to generate the first calibrated ink deposition data.

11. The computer readable medium of claim 10, wherein the ink model comprises a Weibull ink model.

12. The computer readable medium of claim 8, wherein the first calibrated ink deposition data is generated by performing a direct conversion of the uncalibrated ink deposition data to the calibrated ink deposition data by applying the transfer function to the uncalibrated ink deposition.

13. The computer readable medium of claim 8, having instructions stored thereon, which when executed by one or more processors, cause the processors to:
   generate second uncalibrated ink deposition data;
   generate a second transfer function based on the second uncalibrated ink deposition data and the first calibrated ink deposition data; and
   transmit the second transfer function.

14. A method comprising
   generating first uncalibrated ink deposition data based on the ink drop size data and the first halftone design;
   receiving first calibrated ink deposition data;
   generating a first transfer function based on the first uncalibrated ink deposition data and the first calibrated ink deposition data; and
   transmitting the first transfer function.

15. The method of claim 14, wherein generating the first uncalibrated ink deposition data further comprises receiving the ink drop size data for each of a plurality of color planes and receiving the first halftone design.

16. The method of claim 15, further comprising:
   generating second uncalibrated ink deposition data;
   generating a second transfer function based on the second uncalibrated ink deposition data and the first calibrated ink deposition data; and
   transmitting the second transfer function.

17. The method of claim 16, wherein the second uncalibrated ink deposition data is generated upon receiving second ink drop size data.

18. The method of claim 14, wherein the first calibrated ink deposition data is generated by applying an ink model to a target optical density (OD) printer response curve to generate the first calibrated ink deposition data.

19. The method of claim 18, wherein the ink model comprises a Weibull ink model.

20. The method of claim 14, wherein the first calibrated ink deposition data is generated by performing a direct conversion of the uncalibrated ink deposition data to the calibrated ink deposition data by applying the transfer function to the uncalibrated ink deposition.

* * * * *